(12) United States Patent
Rivera et al.

(10) Patent No.: US 9,495,562 B2
(45) Date of Patent: Nov. 15, 2016

(54) REMOVABLE STORAGE DEVICE DATA PROTECTION

(75) Inventors: David Rivera, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 544 days.

(21) Appl. No.: 13/189,837

(22) Filed: Jul. 25, 2011

(65) Prior Publication Data

US 2013/0031376 A1  Jan. 31, 2013

(51) Int. Cl.
*G06F 21/78* (2013.01)
*G06F 3/06* (2006.01)

(52) U.S. Cl.
CPC .............. *G06F 21/78* (2013.01); *G06F 3/0614* (2013.01); *G06F 3/0644* (2013.01); *G06F 2221/2105* (2013.01)

(58) Field of Classification Search
CPC .............................. G06F 21/78–21/805; G06F 3/0614–3/0623; G06F 3/0638–3/0644; G06F 2221/2105–2221/2107
See application file for complete search history.

(56) References Cited

U.S. PATENT DOCUMENTS

| 7,543,117 B1* | 6/2009 | Hanan .......................... 711/154 |
| 2008/0276065 A1* | 11/2008 | Jeong ........................... 711/173 |
| 2010/0114990 A1* | 5/2010 | Mehra et al. ................. 707/809 |

OTHER PUBLICATIONS

"TrueCrypt User's Guide", Version 6.3. TrueCrypt Foundation. <truecrypt.org>. Publsihed: Oct. 21, 2009.*

* cited by examiner

*Primary Examiner* — Linglan Edwards
*Assistant Examiner* — Kevin Bechtel
(74) *Attorney, Agent, or Firm* — Ference & Associates LLC

(57) ABSTRACT

Devices, methods and products are described that provide removable storage device data protection. One aspect provides a method comprising: ascertaining a protected removable storage device connected to an information handling device, said protected removable storage device having a first partition for storing data according to a first file system type, and a second partition for storing user data according to a second file system type; and responsive to said information handling device recognizing said second file system type, querying for user credentials to decrypt a data encryption key used to encrypt said user data of said second partition. Other embodiments are described.

20 Claims, 5 Drawing Sheets

REMOVABLE STORAGE DEVICE DATA PROTECTION

BACKGROUND

Various user data, such as picture files, video files, electronic document files, et cetera, for use with information handling devices, such as tablet/slate computing devices, laptop computers, smart phones, and the like, is stored on storage media. Information handling devices typically have internal (or integrated) storage device(s), and may also be connected to external/removable storage device(s).

Mobile information handling devices often use a removable storage device, such as a secure digital card, "SD CARD", for storage of user data. The removable storage device allows the user to conveniently move the data between devices, but such portability advantages also make such storage devices more prone to loss or theft. For example, if a SD CARD is lost or stolen, the user's data stored thereon, which could include personal and confidential information, could be compromised. SD CARD is a registered trademark of Absolute USA Inc. in the United States and other countries.

BRIEF SUMMARY

In summary, one aspect provides a method comprising: ascertaining a protected removable storage device connected to an information handling device, said protected removable storage device having a first partition for storing data according to a first file system type, and a second partition for storing user data according to a second file system type; and responsive to said information handling device recognizing said second file system type, querying for user credentials to decrypt a data encryption key used to encrypt said user data of said second partition.

Another aspect provides an information handling device comprising: one or more processors; and a connection for a protected removable storage device; wherein, responsive to execution of computer program instructions accessible to the one or more processors, the one or more processors are configured to: ascertain a protected removable storage device connected to said information handling device, said protected removable storage device having a first partition for storing data according to a first file system type, and a second partition for storing user data according to a second file system type; and responsive to said information handling device recognizing said second file system type, query for user credentials to decrypt a data encryption key used to encrypt said user data of said second partition.

A further aspect provides a program product comprising: a storage medium having program code embodied therewith, the program code comprising: program code configured to ascertain a protected removable storage device connected to an information handling device, said protected removable storage device having a first partition for storing data according to a first file system type, and a second partition for storing user data according to a second file system type; and program code configured to, responsive to said information handling device recognizing said second file system type, query for user credentials to decrypt a data encryption key used to encrypt said user data of said second partition.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

An embodiment provides protection of user data on a removable storage device, such as a removable SD CARD, by encrypting the contents of the removable storage device and allowing the data on the card to only be read by the user that encrypted. The user may read the card on another system of similar type, for example in the event that the original system becomes inoperable.

The illustrated example embodiments will be best understood by reference to the figures. The following description is intended only by way of example, and simply illustrates certain example embodiments.

Figure 1:
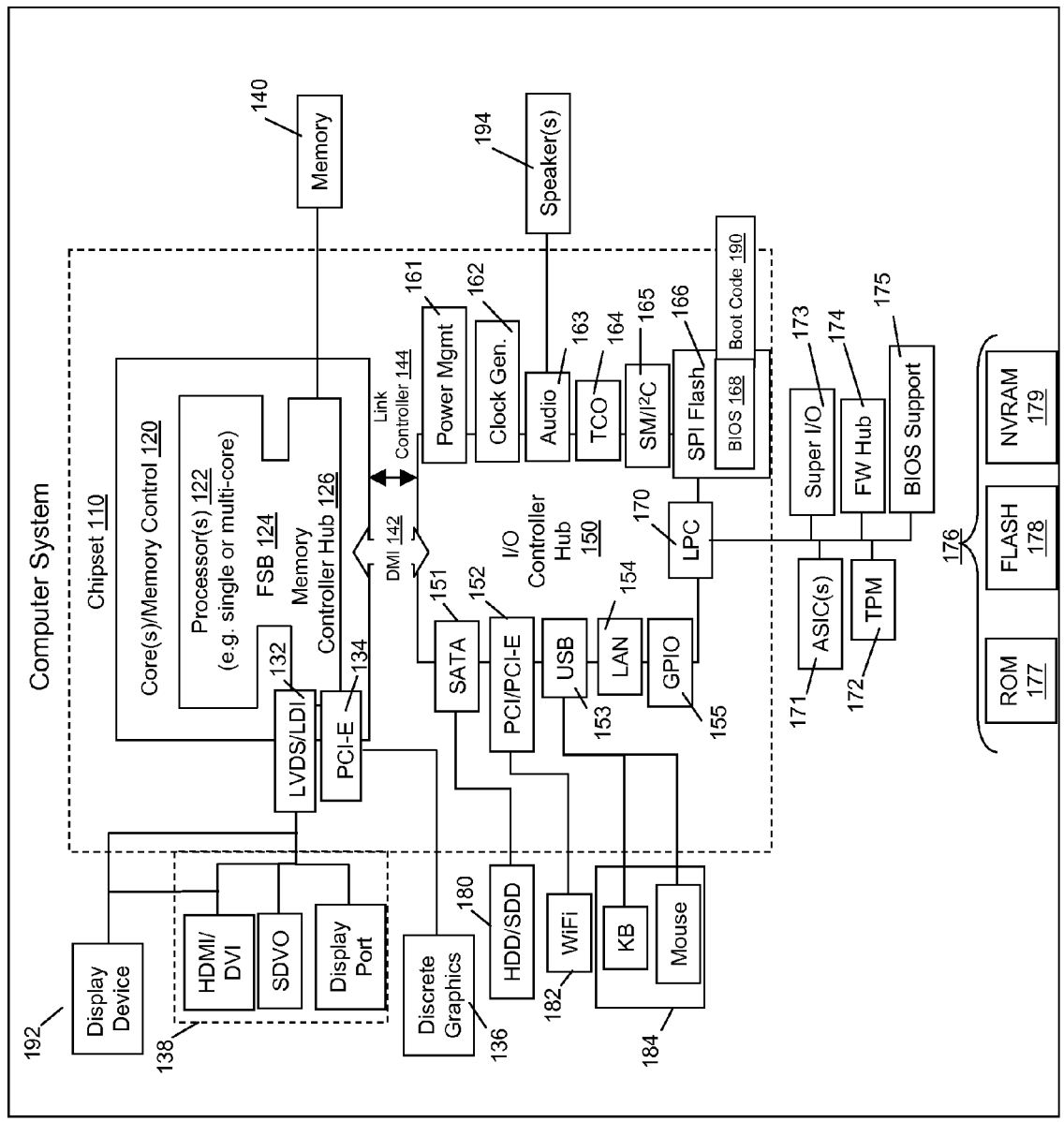
FIG. 1 illustrates an example circuitry of an information handling device.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
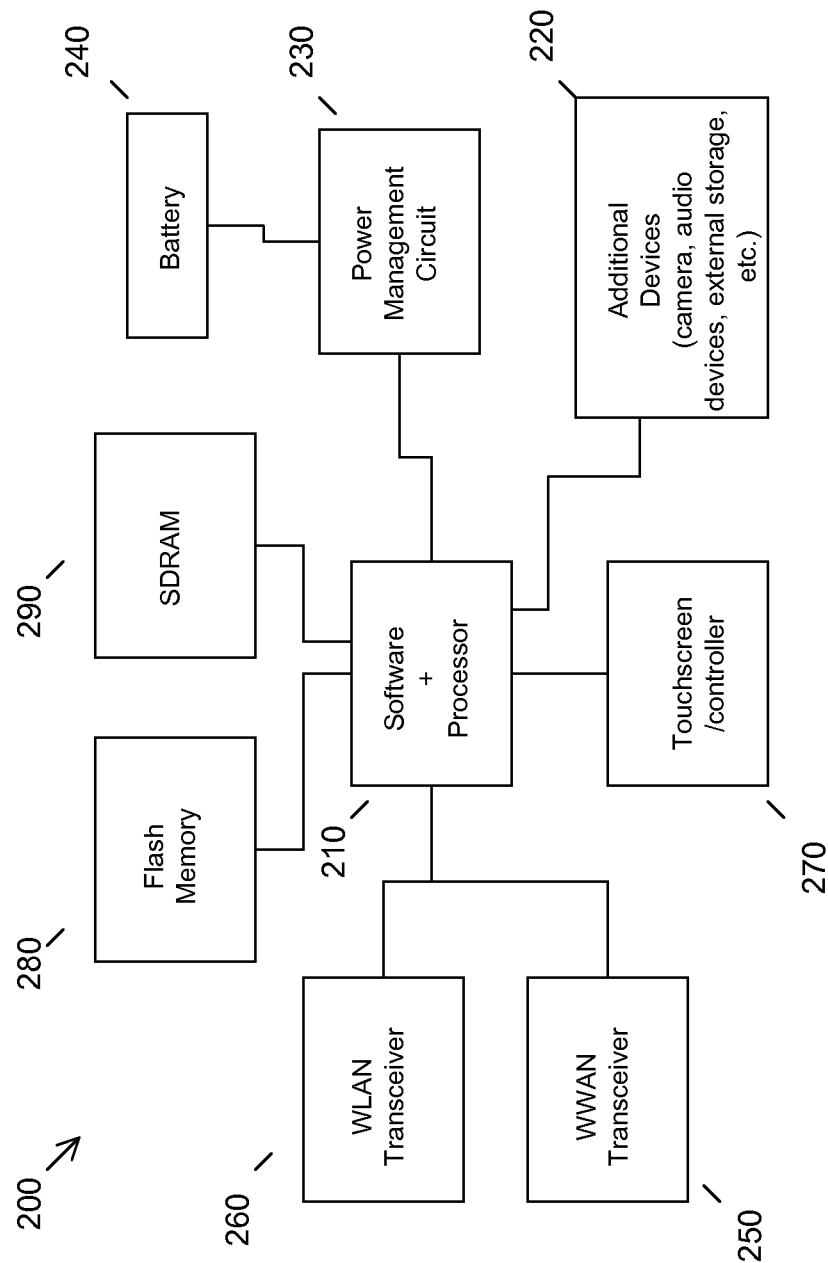
FIG. 2 illustrates another example circuitry of an information handling device.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in the at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

Figure 3:
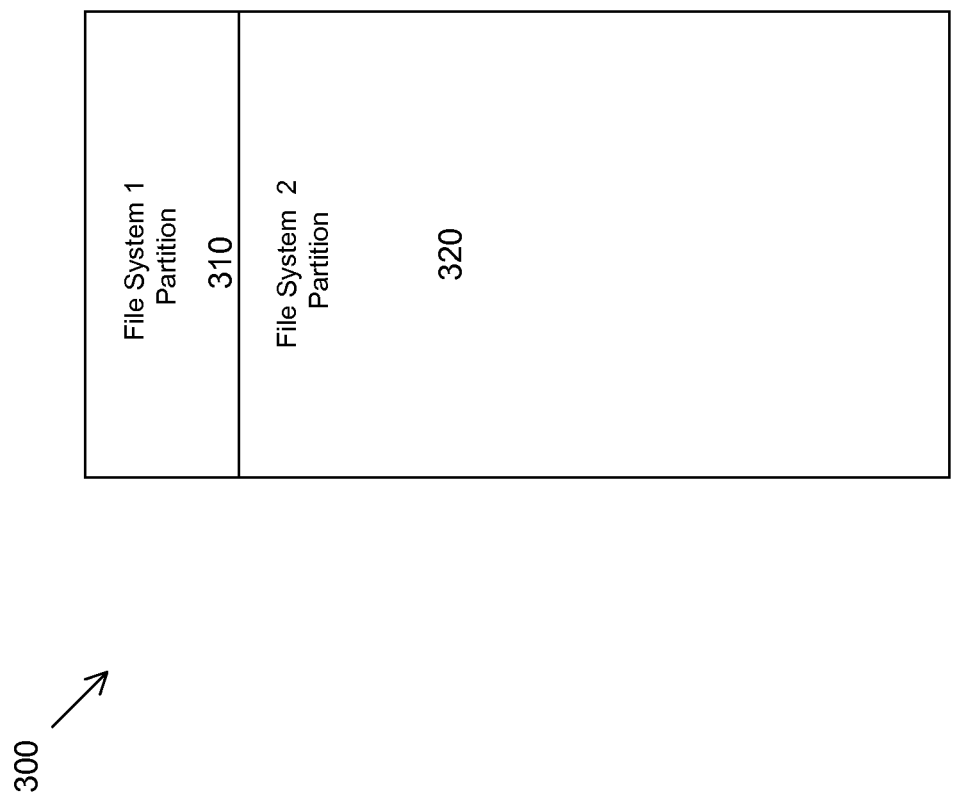
FIG. 3 illustrates an example of a protected removable storage device.

Referring to FIG. 3, an example of a protected removable storage device 300 is illustrated. The example protected removable storage device may, for example, be utilized in connection with information handling devices such as those outlined in FIGS. 1-2. For example, the protected removable storage device may be an SD CARD for use in connection with a tablet computer system.

The protected removable storage device illustrated in the example of FIG. 3 includes more than one partition 310, 320. In the example of FIG. 3, there are two partitions 310, 320; however, this is merely an example, and an embodiment may provide a plurality of partitions. According to an embodiment, at least two of the partitions utilize different file types. For example, the partition 310 utilizes a first file system type ("File System 1"), which may for example be a FAT file system type, such as for use in connection with a WINDOWS operating system. Another file system type is utilized for one or more other partitions. In the example of FIG. 3, partition 320 utilizes another file system type ("File System 2"), which may be for example Ext4 for use in connection with an ANDROID operation system. WINDOWS is a registered trademark of Microsoft Corp. in the United States and other countries. ANDROID is a registered trademark of Google Inc. in the United States and other countries.

Figure 4:
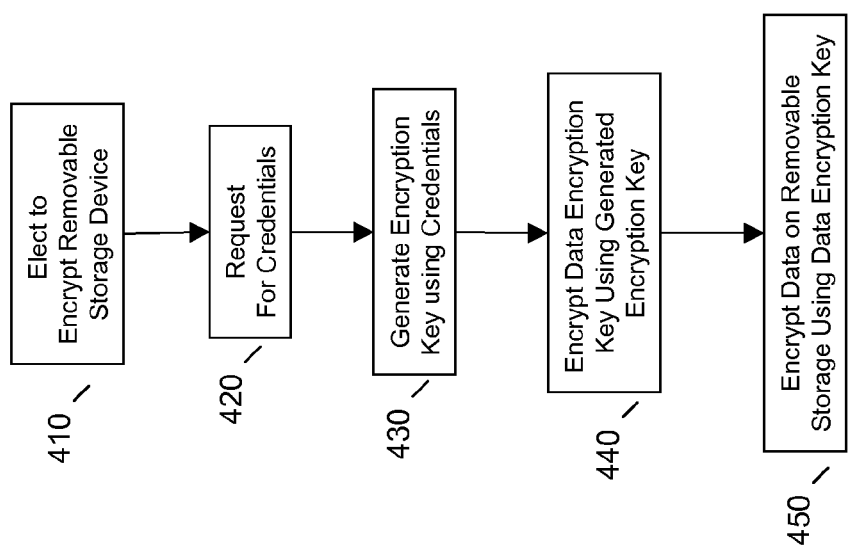
FIG. 4 illustrates an example method of encrypting user data on a protected removable storage device.

Referring to FIG. 4, an embodiment provides protection to a removable storage device in part via encryption. Responsive to a user electing to encrypt contents of a removable storage device, 410, an embodiment requests credentials 420. The credentials requested are to be used to encrypt an encryption key, referred to herein as a data encryption key. For example, a user may provide a device login password or credentials, a remote login password or credentials, a biometric login credential, or the like, in response to the request.

An embodiment uses these credentials to generate an encryption key (referred to herein as a first encryption key) 430 that may be used to encrypt the data encryption key. Thus, the first encryption key is generated using for example a user's device login credentials, which is in turn used to encrypt a data encryption key. As an example, a user may be relieved from remembering an additional password for encryption by generating the first encryption key using his or her existing login credentials. The login credentials may be input to an information handling device, such as via typing them in, or the login credentials may be stored on the user's information handling device, or at another location, and automatically retrieved in response to the request. The data encryption key may be stored on the protected, removable storage device, or may be retrieved from another location.

When the encryption is thus initialized, user data such as user files (movie files, music files, word processing document files, and the like) may be encrypted using the data encryption key 440. The user data resides on a given partition. Thus, the encrypted data of the partition is encrypted using the data encryption key. For example, partition 320 may be used for storing the encrypted user data according to an Ext4 file system. Thus, only information handling devices recognizing the Ext4 files system type, such as a device operating an ANDROID operating system, will recognize the partition even exists on the protected removable storage device, much less stores user data thereon. Furthermore, a user wanting access to the decrypted data stored thereon will be required to supply the appropriate credentials utilized to generate the first encryption key.

Referring back to FIG. 3, another partition of the protected storage device 300 may contain other data. For example, partition 310 may store an indication that another partition exists on the protected removable storage device 300. This data may be stored according to another type of file system, for example a FAT file system type. Thus, only devices recognizing the FAT file system type will recognize the partition exists, much less be able to access any data stored thereon. The data on a partition may be un-encrypted. For example, an embodiment provides that data stored on a FAT file system type partition may include an un-encrypted notice that another partition exists such that a device operating a WINDOWS operating system will be aware that other partition(s) exist. This will prevent a user from inadvertently formatting the protected removable storage device while operating it on a WINDOWS operating system information handling device, thus avoiding inadvertent loss of encrypted user data resident on any "hidden" partitions.

Figure 5:
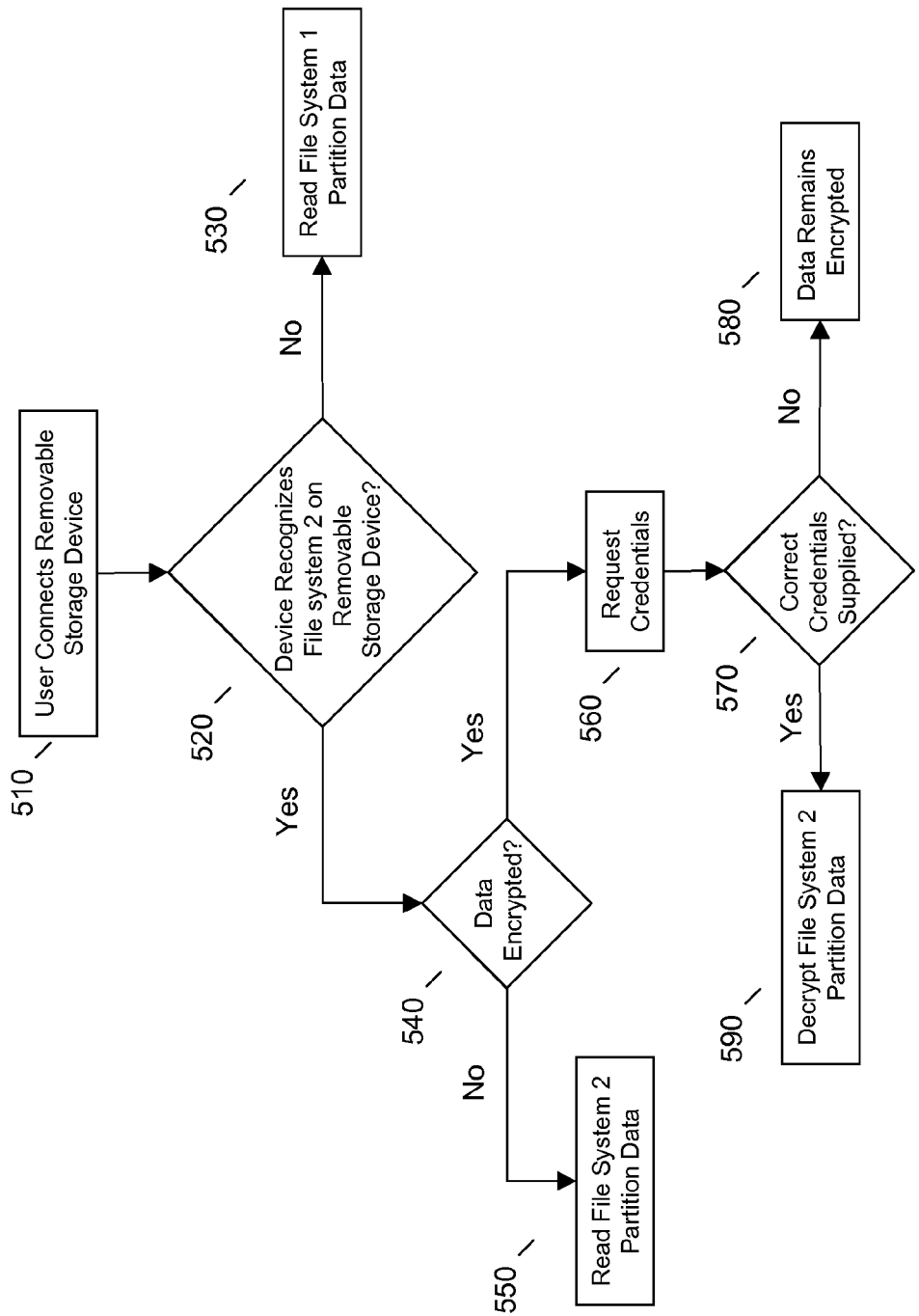
FIG. 5 illustrates an example method of using a protected removable storage device.

Referring to FIG. 5, when a user inserts or otherwise connects a protected removable storage device, 510, the information handling device will recognize one of the first file system type or the second file system type. Thus, the information handling device recognizes one of the first file system type or second file system type 520. If the information handling device does not recognize the file system 2, in this example where the user data is stored, the information handling device (for example, a device operating WINDOWS operating system) will read the data resident on the first partition, in this example a notice that another partition exists 530.

If the information handling device does recognize file system 2, in this example Ext4, the device may simply retrieve that data if the data is not encrypted 540. This would correspond to the use case where a user has chosen not to encrypt the data resident on the partition 320. However, if the data is encrypted, the device may request credentials 570 required to decrypt the data resident on the second partition 320. If the correct credentials are not supplied 570, the first encryption key cannot be generated and thus the data encryption key cannot be decrypted, leaving the data encrypted 580. However, if the correct credentials are available, the first encryption key may be generated, the data encryption key may be decrypted, and the data on the second partition 320 made accessible (decrypted) 590.

Thus, an embodiment provides a protected removable storage device in that data is only detectable on certain systems and, even if data is detectable, the data is encrypted. The protected removable storage device may include a partition for storing encrypted user data according to a first file system type, recognizable only to an information handling device operating an appropriate operating system type. The protected removable storage device may also include another partition storing data, which may be unencrypted, according to another file system type, such that an information handling device operating under another operating system may recognize the other file system type and access the data. The other partition may include data indicating that a hidden partition is located on the protected removable storage device such that a user does not inadvertently format the protected removable storage device, losing encrypted user data stored thereon. An embodiment further may utilize a user's existing login credentials to provide data encryption such that the user is relieved of remembering additional passwords.

Embodiments may be implemented in one or more information handling devices configured appropriately to execute program instructions consistent with the functionality of the embodiments as described herein. In this regard, FIGS. 1-2 illustrate non-limiting examples of such devices and components thereof. While mobile computing systems such as tablet computers, laptop computers, and smart phones have been specifically mentioned as examples herein, embodiments may be implemented using other systems or devices, such as desktops, workstations, servers and the like.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
    ascertaining a protected removable storage device is connected to an information handling device, said protected removable storage device having a first partition for storing data according to a first file system type, and a second partition for storing user data according to a second, different, file system type; and
    responsive to said information handling device recognizing said second file system type, querying for user credentials to decrypt a data encryption key used to encrypt said user data of said second partition;
    wherein said information handling device recognizes said second file system type associated with said second partition but does not recognize said first file system type associated with said first partition;
    wherein said second partition contains a different, independent data set than said first partition; and
    wherein said first partition includes an unencrypted indication that provides notice to a second information handling device that recognizes the first file system type that the second partition contains data.

2. The method of claim 1, wherein said indication comprises data formatted according to the first file system type which is displayed by a system using the first file system type to indicate that said protected removable storage device contains additional data in said second partition.

3. The method of claim 1, further comprising generating a first encryption key from said user credentials.

4. The method of claim 3, further comprising encrypting said data encryption key with said first encryption key.

5. The method of claim 1, further comprising, responsive to decrypting said data encryption key, decrypting user data using said data encryption key.

6. The method of claim 5, wherein said user data comprises one or more user files stored in an encrypted form on said second partition.

7. The method of claim 1, wherein said user credentials include one or more of: device login credentials, remote login credentials, and biometric credentials.

8. The method of claim 1, wherein said protected removable storage device is non-volatile memory connectable to one or more of: a tablet computer, a laptop computer, and a mobile phone.

9. The method of claim 1, wherein said information handling device is selected from the group consisting of a tablet computer, a laptop computer, and a mobile phone.

10. An information handling device comprising:
    one or more processors; and
    a connection for a protected removable storage device;
    wherein, responsive to execution of computer program instructions accessible to the one or more processors, the one or more processors are configured to:
        ascertain a protected removable storage device is connected to said information handling device, said protected removable storage device having a first partition for storing data according to a first file system type, and a second partition for storing user data according to a second, different, file system type; and
        responsive to said information handling device recognizing said second file system type, query for user credentials to decrypt a data encryption key used to encrypt said user data of said second first partition;
    wherein said information handling device recognizes said second file system type associated with said second partition but does not recognize said first file system type associated with said first partition;
    wherein said second partition contains a different, independent data set than said first partition; and
    wherein said first partition includes an unencrypted indication that provides notice to a second information handling device that recognizes the first file system type that the second partition contains data.

11. The information handling device of claim 10, wherein data of said first partition includes an indication that said protected removable storage device contains additional data.

12. The information handling device of claim 10, wherein said one or more processors are further configured to generate a first encryption key from said user credentials.

13. The information handling device of claim 12, wherein said one or more processors are further configured to encrypt said data encryption key with said first encryption key.

14. The information handling device of claim 10, wherein said one or more processors are further configured to, responsive to decrypting said data encryption key, decrypt user data using said data encryption key.

15. The information handling device of claim 14, wherein said user data comprises one or more user files stored in an encrypted form on said second partition.

16. The information handling device of claim 10, wherein said user credentials include one or more of: device login credentials, remote login credentials, and biometric credentials.

17. The information handling device of claim 10, wherein said protected removable storage device is non-volatile memory connectable to one or more of: a tablet computer, a laptop computer, and a mobile phone.

18. The information handling device of claim 10, wherein said information handling device is selected from the group consisting of: a tablet computer, a laptop computer, and a mobile phone.

19. A program product comprising:
a storage device having program code embodied therewith, the program code comprising:
program code configured to ascertain a protected removable storage device is connected to said information handling device, said protected removable storage device having a first partition for storing data according to a first file system type, and a second partition for storing user data according to a second, different, file system type; and
program code configured to, responsive to said information handling device recognizing said second file system type, query for user credentials to decrypt a data encryption key used to encrypt said user data of said second partition;
wherein said information handling device recognizes said second file system type associated with said second partition but does not recognize said first file system type associated with said first partition;
wherein said second partition contains a different, independent data set than said first partition; and
wherein said first partition includes an unencrypted indication that provides notice to a second information handling device that recognizes the first file system type that the second partition contains data.

20. The program product according to claim 19, further comprising program code configured to, responsive to decrypting said data encryption key, decrypt user data using said data encryption key.

* * * * *